(12) United States Patent
Kim et al.

(10) Patent No.: US 6,812,610 B2
(45) Date of Patent: Nov. 2, 2004

(54) ROTARY ELECTRIC MACHINE, LINEAR MOTOR AND STATOR THEREOF

(75) Inventors: Houng Joong Kim, Hitachi (JP); Noriaki Yamamoto, Fujisawa (JP); Daisuke Sato, Hitachinaka (JP); Hisaya Shimizu, Hitachinaka (JP); Keiichi Mashino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/811,554

(22) Filed: Mar. 20, 2001

(65) Prior Publication Data

US 2002/0047449 A1 Apr. 25, 2002

(30) Foreign Application Priority Data

Jul. 19, 2000 (JP) .................................... 2000-219687

(51) Int. Cl.$^7$ ................................................ H02K 3/28
(52) U.S. Cl. ................... 310/184; 310/180; 310/195; 310/198
(58) Field of Search ............................... 310/198, 202, 310/179, 184, 12, 203, 195

(56) References Cited

U.S. PATENT DOCUMENTS

| 3,321,653 | A | | 5/1967 | Sonoyama | |
|---|---|---|---|---|---|
| 3,324,322 | A | * | 6/1967 | Johns | 310/198 |
| 3,622,818 | A | * | 11/1971 | Payen | 310/13 |
| 3,673,477 | A | * | 6/1972 | Broadway et al. | 310/202 |
| 3,746,899 | A | * | 7/1973 | Eastham | 104/294 |
| 4,127,787 | A | * | 11/1978 | Auinger | 310/184 |
| 4,408,145 | A | | 10/1983 | Artemenko et al. | |
| 4,692,646 | A | * | 9/1987 | Gotou | 310/156.43 |
| 5,592,731 | A | | 1/1997 | Huang et al. | |
| 6,141,865 | A | * | 11/2000 | Kakutani et al. | 140/92.1 |

FOREIGN PATENT DOCUMENTS

| JP | 57148544 | 9/1982 |
|---|---|---|
| JP | 58154349 | 9/1983 |
| JP | 59127547 | 7/1984 |
| JP | 02060438 | 2/1990 |

OTHER PUBLICATIONS

Emery et al. "Electric Motors and Generators Illustrated" pp. 108–109, Fig. 12, (1959).*

* cited by examiner

Primary Examiner—Burton Mullins
(74) Attorney, Agent, or Firm—Antonelli, Terry, Stout & Kraus, LLP (57) ABSTRACT

One slot arranged between two slots containing a first armature winding contains a second armature winding for a phase different from a phase of the first armature winding; one slot arranged between the two slots containing the first armature winding contains a third armature winding for a phase equal to the phase of the second armature winding; and, one of the second armature winding and the third armature winding is arranged in a coil end portion in an outer peripheral side of the first armature winding, and the other is arranged in an inner peripheral side of the armature winding. With this, the projected height of the coil end portion of the stator can be reduced.

5 Claims, 9 Drawing Sheets

FIG. 1

1 ··· STATOR CORE
1a ··· BACK YOKE PORTION
1b ··· TEETH PORTION
2 ··· SLOT
3 ··· ARMATURE WINDING

ROTARY ELECTRIC MACHINE, LINEAR MOTOR AND STATOR THEREOF

BACKGROUND OF THE INVENTION

The present invention relates to a rotary electric machine, a linear motor and to a stator used for them.

Figure 8:
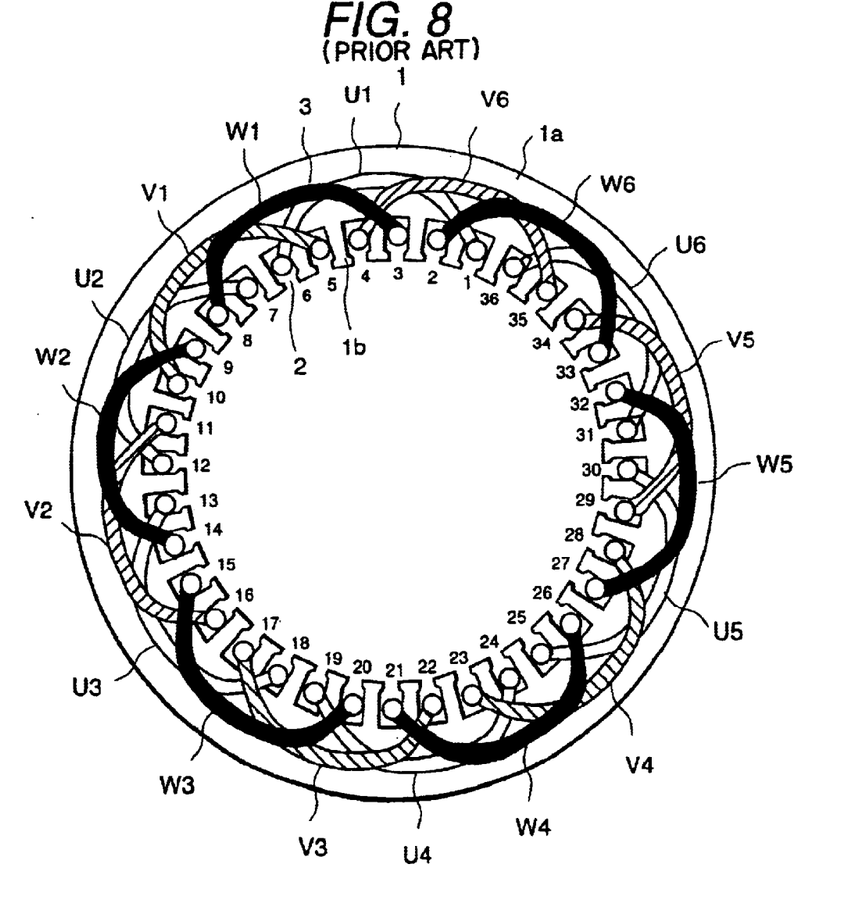
FIG. 8 is a schematic diagram showing the side face of a stator in a conventional rotary machine.
Figure 9:
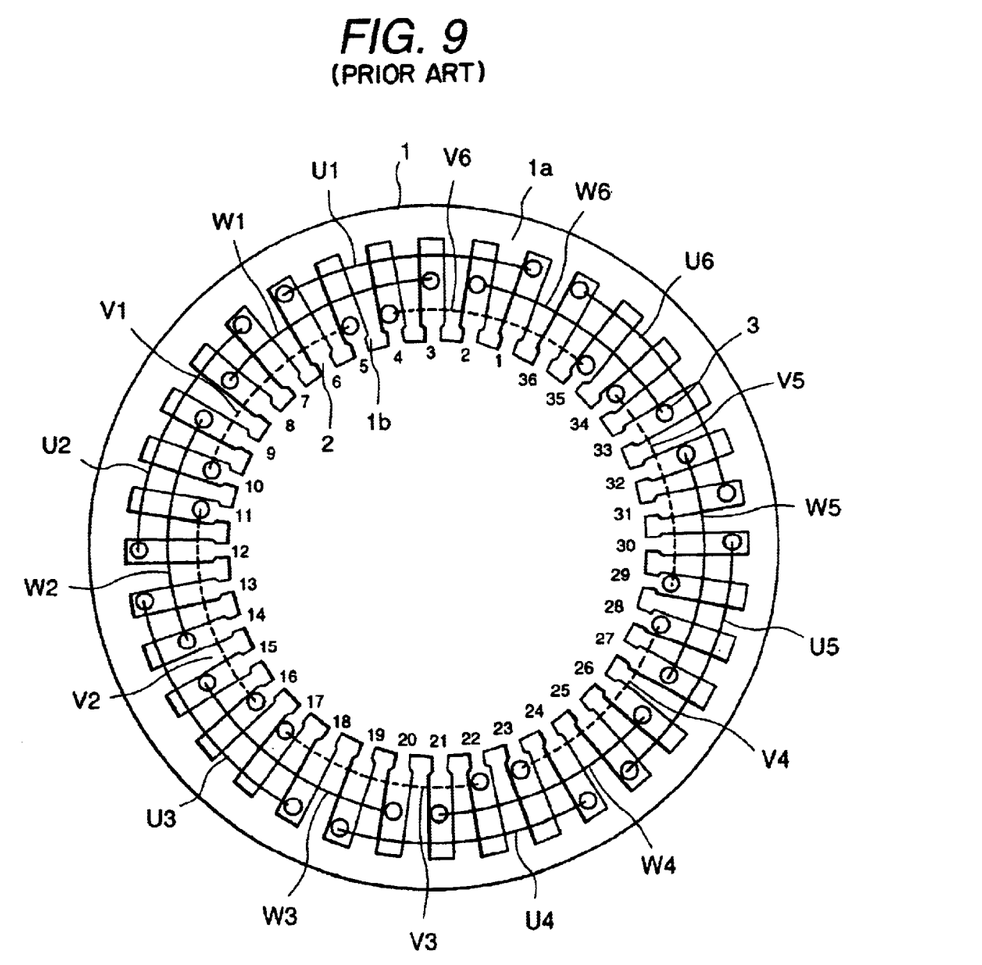
FIG. 9 is a wiring diagram showing the connection of the armature windings to the stator in the rotary electric machine shown in FIG. 8.

In a stator of a known rotary electric machine, armature windings are constructed as a single layer distributed winding and are contained in a 3-phase-6-pole stator core having 36 slots, 2 slots per pole per phase, as shown in FIG. 8 and FIG. 9. The stator comprises a stator core 1 which has a back yoke portion 1a formed in a cylindrical shape; a plurality of tooth portions 1b projecting from the inner peripheral face of the back yoke portion 1a and extending toward the center; and slots 2, each formed between adjacent tooth portions 1b. The plurality of armature windings 3 formed in a ring shape are arranged and contained in the slots 2 with an arbitrary slot pitch.

The end coil portion of the armature winding 3 of the rotary electric machine is arranged in a form such that it is pushed and bent into a space near the side face of the back yoke portion 1b of the stator core 1.

In the stator having armature windings 3 that are single layer wound, as described above, winding is performed by initially inserting the windings U1, U2 . . . in the outer peripheral (back bottom) side of the slot 2, and then by inserting the windings V1, V2 . . . in the inner peripheral side of the slot 2, and finally by inserting the windings W1, W2 . . . in the innermost peripheral side of the slot 2 (therein, the reference character attached to individual windings U, V, W represents the windings for U-phase, V-phase and W-phase, respectively). In the winding process, the individual coil end portions of the windings are arranged in the side face of the back yoke portion 1a of the stator core 1, and the coil end portions of the windings W1, W2 . . . finally inserted are arranged onto the upper side of the coil end portions of the windings U1, U2 . . . , W1, W2 . . . for the V-phase and W-phase.

Figure 10A:
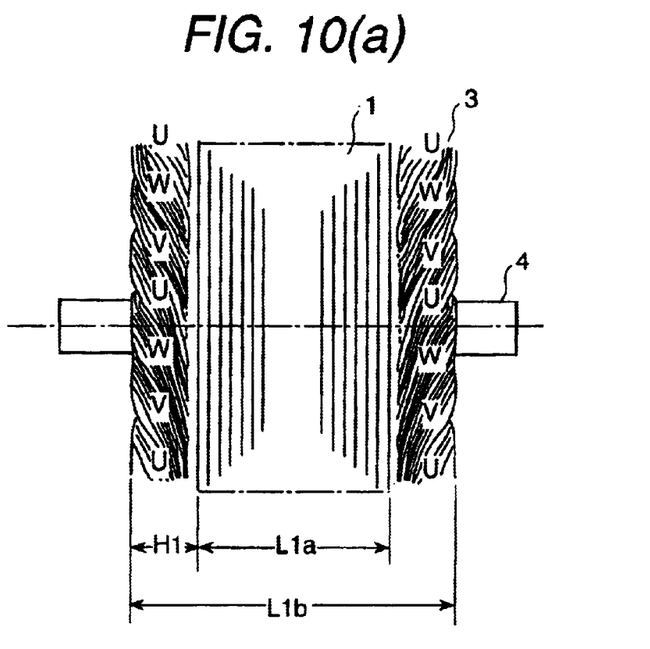
FIGS. 10(a) and 10(b) are plan views illustrating the dimension in an axial direction of a stator of a rotary electric machine in accordance with the present invention and a conventional rotary electric machine, respectively.
Figure 10B:
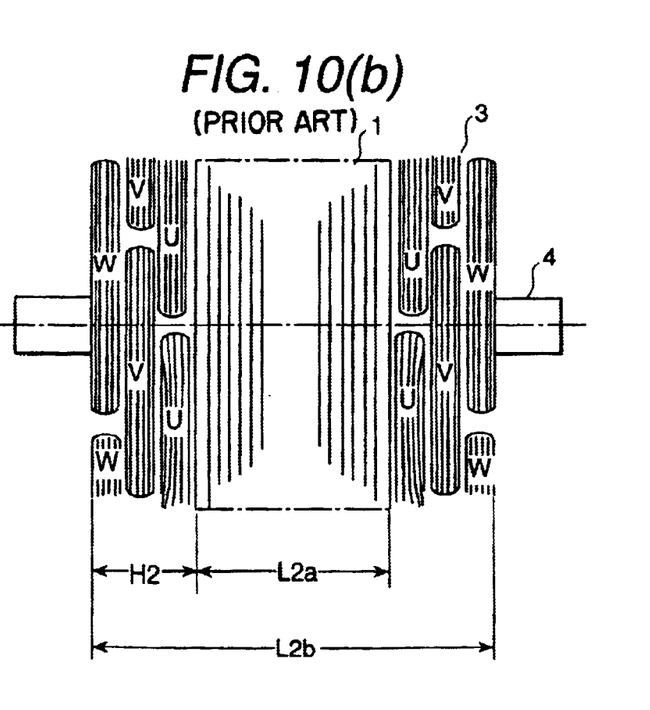

In the coil end portions of the windings in the side face of the back yoke portion 1a of the stator core 1, the height (dimension of the projected portion) H2 of the coil end portion becomes high, because the end portions are arranged with one phase overlapped on the other phase, as shown in FIG. 10(b). Therefore, the axial dimension L2b of the stator, that is, the sum of the projected dimension H2 of the coil end portions and the thickness dimension L2a of the stator core 1 becomes large. In the drawings, the reference character 4 represents a rotor shaft. In a linear motor, this means that the width dimension of the linear motor becomes large.

SUMMARY OF THE INVENTION

An object of the present invention is to reduce the axial dimension or width dimension of a stator by reducing the projected dimension of the end coil portions of the windings contained in the stator core.

Another object of the present invention is to further reduce the wiring work cost and the material cost.

The present invention is characterized by a stator comprising a stator core having an even number of slots per pole per phase; and armature windings contained in the slots, the armature windings being wound as a single layer distributed winding. In this stator, one of the slot arranged between two slots containing a first armature winding contains a second armature winding for a phase different from the phase of the first armature winding; one of the slots arranged between two of the slots containing the first armature winding contains a third armature winding for a phase equal to the phase of the second armature winding; and, one of the second armature winding and the third armature winding is arranged in a coil end portion in an outer peripheral side of the first armature winding, and the other is arranged in an inner peripheral side of the first armature winding.

Further, the stator is characterized by the fact that it is constructed by partially performing winding of the armature windings on a plurality of divided cores formed by laminating segments stamped in a sector shape; and then assembling the plurality of divided cores into a cylindrical shape and arranging the armature windings to spread over the divided cores into the individual slots.

Further, the stator is characterized by the fact that an axial dimension of the stator, including the stator core and the coil end portions, is reduced by arranging the coil end portions in a space near a side face of a back yoke portion.

Furthermore, a rotary electric machine is constructed using the stator described above and a rotor which is held so as to be arranged opposite to the stator. A linear motor is constructed using the stator described above and a mover which is held so as to be arranged opposite to the stator.

DESCRIPTION OF THE PREFERRED EMBODIMENTS

A rotary electric machine or a linear motor in accordance with the present invention comprises a stator having armature windings and a movable part, such as a rotor or a mover, held so as to be arranged opposite to the stator, though the rotary electric machine or the linear motor is not illustrated in the drawing in the present application. The movable part comprises secondary electric conductors in the case of an induction motor or magnetic poles in the case of a synchronous motor.

In a machine performing speed control or position control, electric power is supplied to the armature windings using an inverter circuit. The present invention characterizes the stator in such a rotary electric machine or a linear motor, and embodiments of the stator will be described below with reference to the accompanying drawings.

First Embodiment

Figure 1:
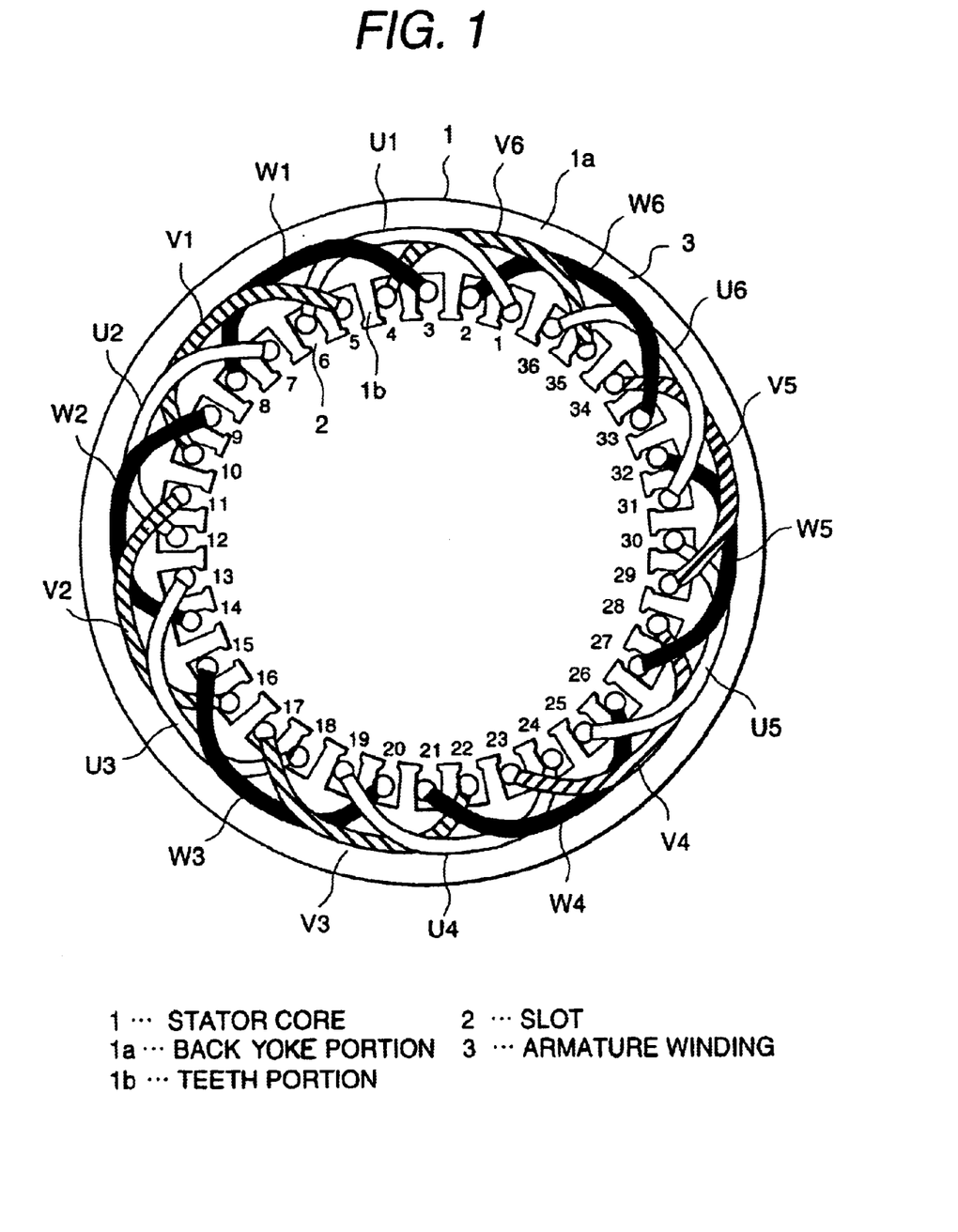
FIG. 1 is a schematic diagram showing the side face of a stator representing a first embodiment of a rotary electric machine in accordance with the present invention.
Figure 2:
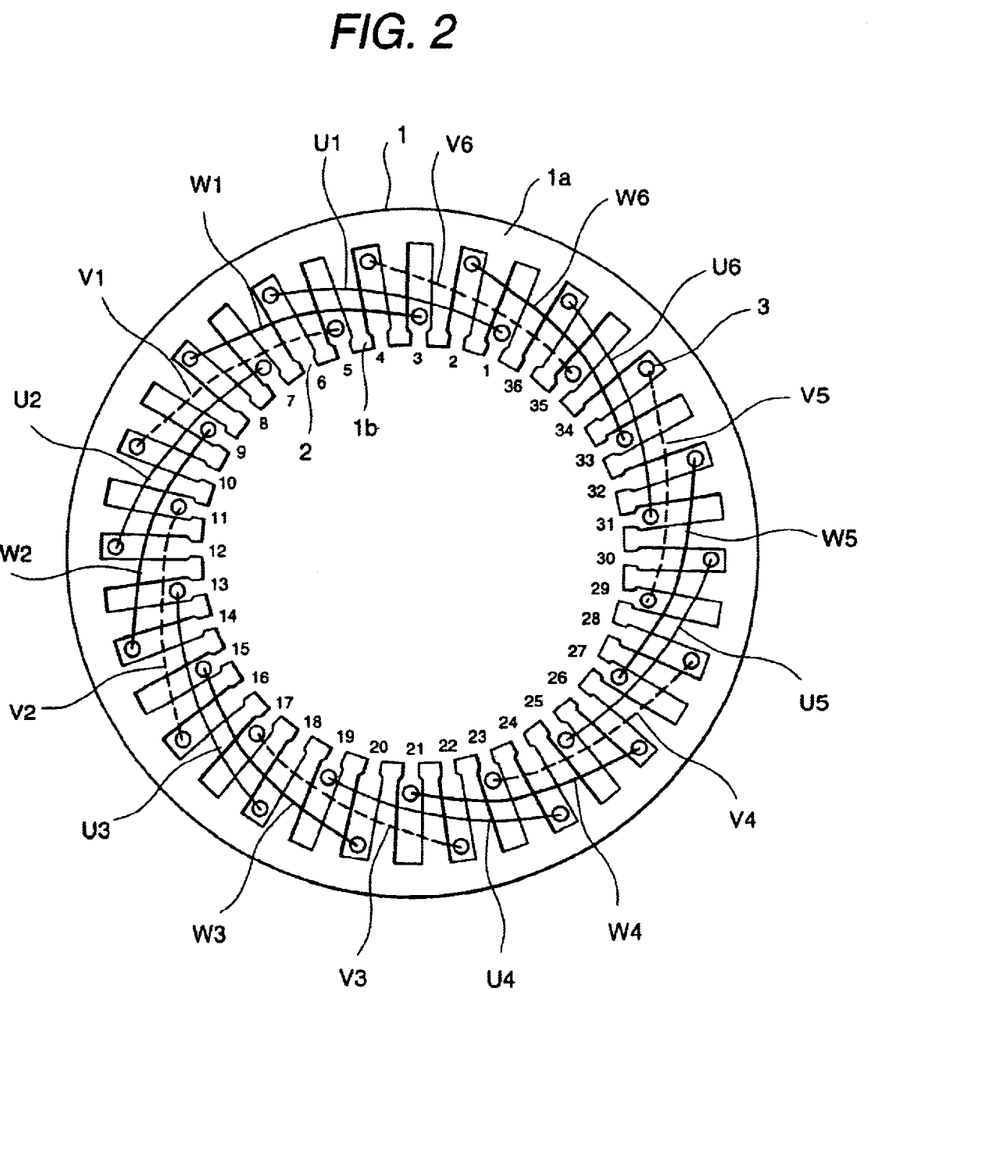
FIG. 2 is a wiring diagram showing the connection of the armature windings to the stator in the rotary electric machine shown in FIG. 1.

FIG. 1 is a schematic diagram showing the side face of a stator representing a first embodiment of a rotary electric machine in accordance with the present invention. FIG. 2 is a wiring diagram showing the connection of the armature windings to the stator in the rotary electric machine. In this first embodiment of the invention, the stator contains single layer distributed wound armature windings 3 in a 3-phase-6-pole stator core having 36 slots, 2 slots per pole per phase.

Referring to FIG. 1 and FIG. 2, as in a conventional stator core, the stator core 1 comprises a back yoke portion 1a formed in a cylindrical shape; a plurality of tooth portions 1b projecting from the inner peripheral face of the back yoke portion 1a and extending toward the center; and slots 2, each formed between adjacent tooth portions 1b.

The armature windings 3 are contained in the individual slots 2 so as to be arranged in the order of the winding U1 for the U-phase, the winding W1 for the W-phase, the winding V1 for the V-phase, the winding U2 for the U-phase, the winding W2 for the W-phase, the winding V2 for the V-phase . . . (contained in order of U1, W1, V1, U2, W2, V2, . . . Un, Wn, Vn).

This arrangement of the windings is formed as follows. The winding U1 to be provided first is inserted into the slots 2 of slot number 1 and slot number 6 of the stator core 1, and the winding W1 to be provided next is inserting into the slots 2 of slot number 3 and slot number 8 of the stator core 1. However, in regard to the inserting of the windings into the slots 2 of slot number 1 and slot number 3, the windings are only temporarily put in the slots. After that, the winding work is successively performed to insert the winding V1 into the slots of slot number 5 and slot number 10, the winding U2 into the slots of slot number 7 and slot number 12, the winding W2 into the slots of slot number 9 and slot number 14, the winding V2 into the slots of slot number 11 and slot number 16 until the winding U6 is inserted. After the winding W6 and the winding V6 are contained in the slots of slot number 2 and slot number 4, the winding U1 temporarily put into the slot of slot number 1 and the winding W1 temporarily put into the slot of slot number 3 are rearranged so as to be inserted into the corresponding slots 2.

When the dimension of the outer axial length of the rotary electric machine is shortened, the dimension of the above-mentioned projected coil end portions are decreased by pushing and bending the coil end portions of the windings 3 toward the space near the side face of the back yoke portion 1a of the stator core 1 like a file of dominoes.

After all, the stator constructed as described above comprises a stator core having an even number of slots per pole per phase; and armature windings contained in the slots, the armature windings being wound as a single layer distributed winding, wherein one of the slots arranged between two of the slots containing a first armature winding contains a second armature winding for a phase different from a phase of the first armature winding, and one of the slots arranged between two of the slots containing the first armature winding contains a third armature winding for a phase equal to the phase of the second armature winding; and, one of the second armature winding and the third armature winding is arranged in a coil end portion in an outer peripheral side of the first armature winding, and the other is arranged in an inner peripheral side of the first armature winding. As a result, the axial dimension of the stator can be reduced by decreasing the projected dimension of the coil end portions of the windings contained in the stator core.

Second Embodiment

Figure 3:
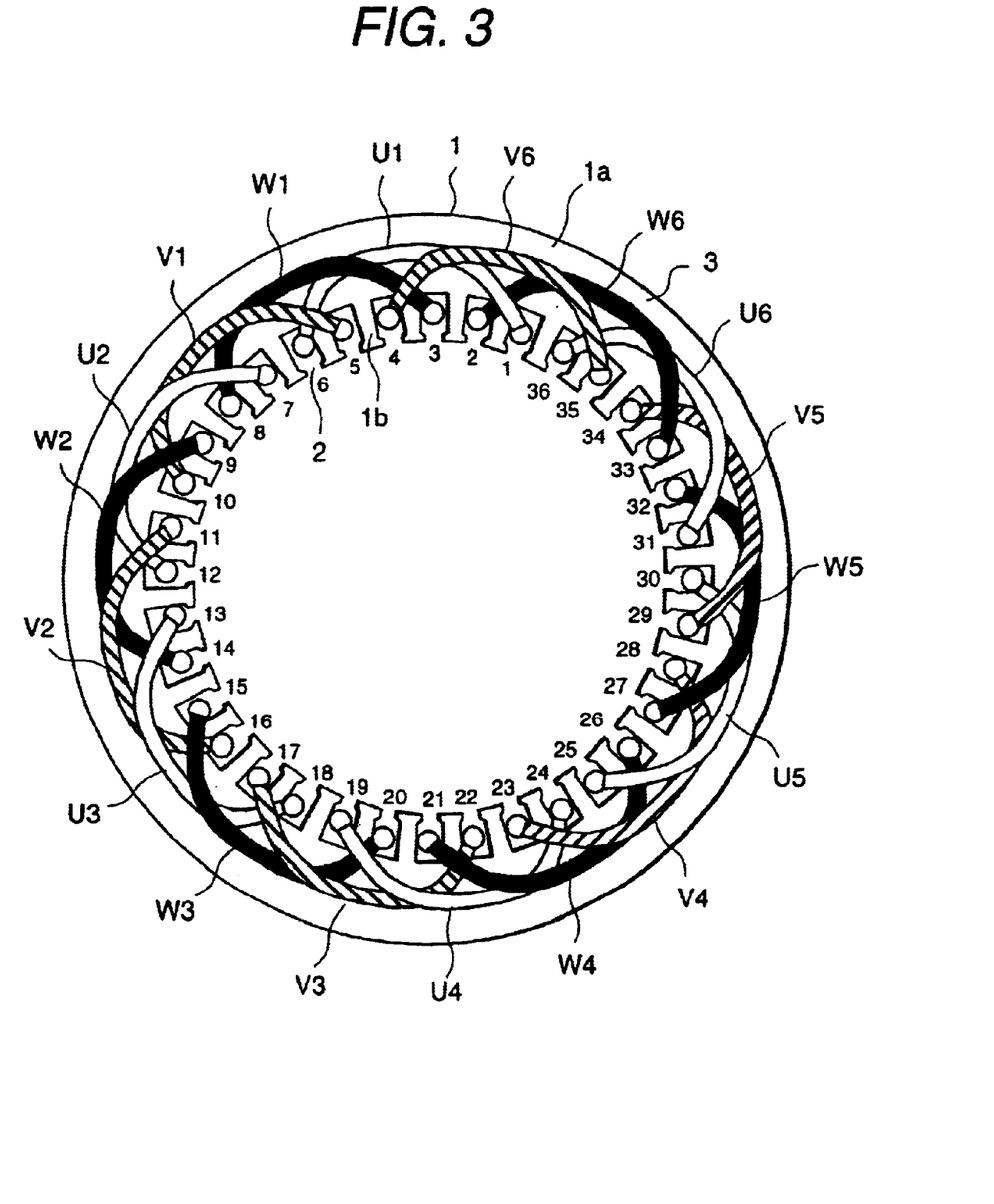
FIG. 3 is a schematic diagram showing the side face of a stator representing a second embodiment of a rotary electric machine in accordance with the present invention.
Figure 4:
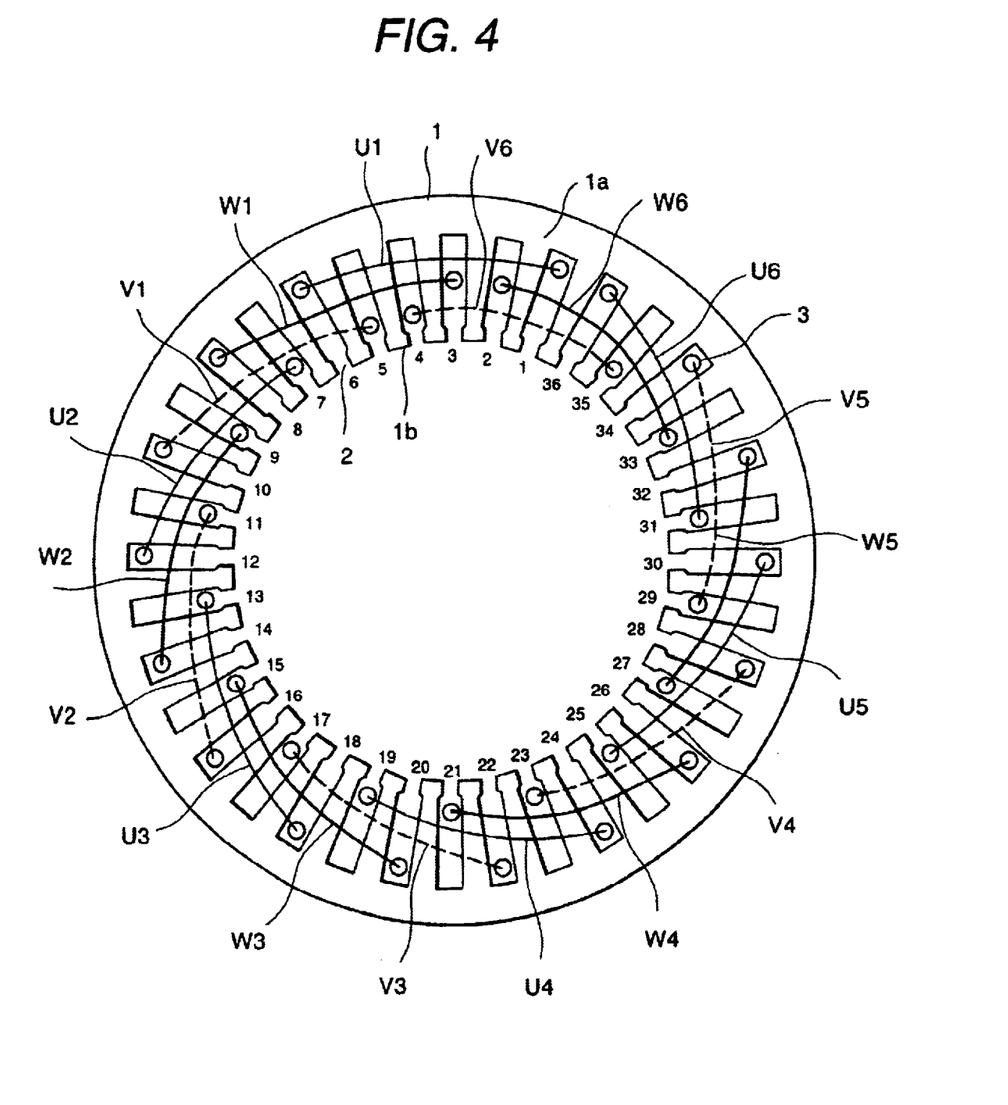
FIG. 4 is a wiring diagram showing connection of the armature windings to the stator in the rotary electric machine shown in FIG. 3.

FIG. 3 is a schematic diagram showing the side face of a stator representing a second embodiment of a rotary electric machine in accordance with the present invention. FIG. 4 is a wiring diagram showing the connection of the single layer distributed wound armature windings to the stator in the rotary electric machine. In this second embodiment of the invention, the stator contains single layer distributed wound armature windings in a 3-phase-6-pole stator core having 36 slots, 2 slots per pole per phase.

The shape of the stator core 1 is the same as the stator core 1 in the first embodiment. Further, the armature windings 3 are contained in the individual slots 2 so as to be arranged in the order of the winding U1 for the U-phase, the winding W1 for the W-phase, the winding V1 for the V-phase, the winding U2 for the U-phase, the winding W2 for the W-phase, the winding V2 for V-phase . . . (contained in the order of U1, W1, V1, U2, W2, V2, . . . Un, Wn, Vn).

In this embodiment, the arrangement of the windings is formed as follows. The winding U1 to be provided first is normally inserted into the slots 2 of slot number 1 and slot number 6 of the stator core 1, and the winding W1 to be provided next is also normally inserted into the slots 2 of slot number 3 and slot number 8 of the stator core 1. After that, the winding work is successively performed to insert the winding V1 into the slots of slot number 5 and slot number 10, the winding U2 into the slots of slot number 7 and slot number 12, the winding W2 into the slots of slot number 9 and slot number 14, the winding V2 into the slots of slot number 11 and slot number 16, until the winding U6 is inserted. The winding W6 and the winding V6 are inserted into the slots of slot number 2 and slot number 4 through the above portions of the coil end portions of the winding U1 contained in the slot of slot number 1 and the winding W1 contained in the slot of slot number 3, respectively.

Similarly, in this stator, when the dimension of the outer axial length of the rotary electric machine is shortened, the dimension of the above-mentioned projected coil end portions are decreased by pushing and bending the coil end portions of the windings 3 toward the space near the side face of the back yoke portion 1a of the stator core 1 like a file of dominoes.

FIG. 10(a) is a plan view illustrating the axial dimension of the stator in the first and the second embodiments, which illustration is provided so as to provide a comparison with a plan view of the axial dimension of the conventional rotary electric machine as represented by FIG. 10(b).

Referring to FIG. 10(a), the height H1 of the coil end portion can be formed so as to be less than the height H2 of the coil end portion of the stator that is wound using the conventional technology shown in FIG. 10(b). Therefore, the total axial length L1b of the rotary electric machine, including the axial length L1a of the stator core and the heights of the coil end portions, can be reduced; and, accordingly, the thickness of the rotary electric machine can be reduced.

Third Embodiment

Although the first and the second embodiments have been shown by way of examples in which the number of slots per pole and per phase is two, in cases where the number of slots per pole and per phase is 4, 6, 8 . . . , the same effect can be attained by similarly applying the present invention. As one example, a description will be given of a rotary electric machine using a stator containing armature windings in a 3-phase-4-pole stator core having 48 slots, 4 slots per pole per phase.

Figure 5:
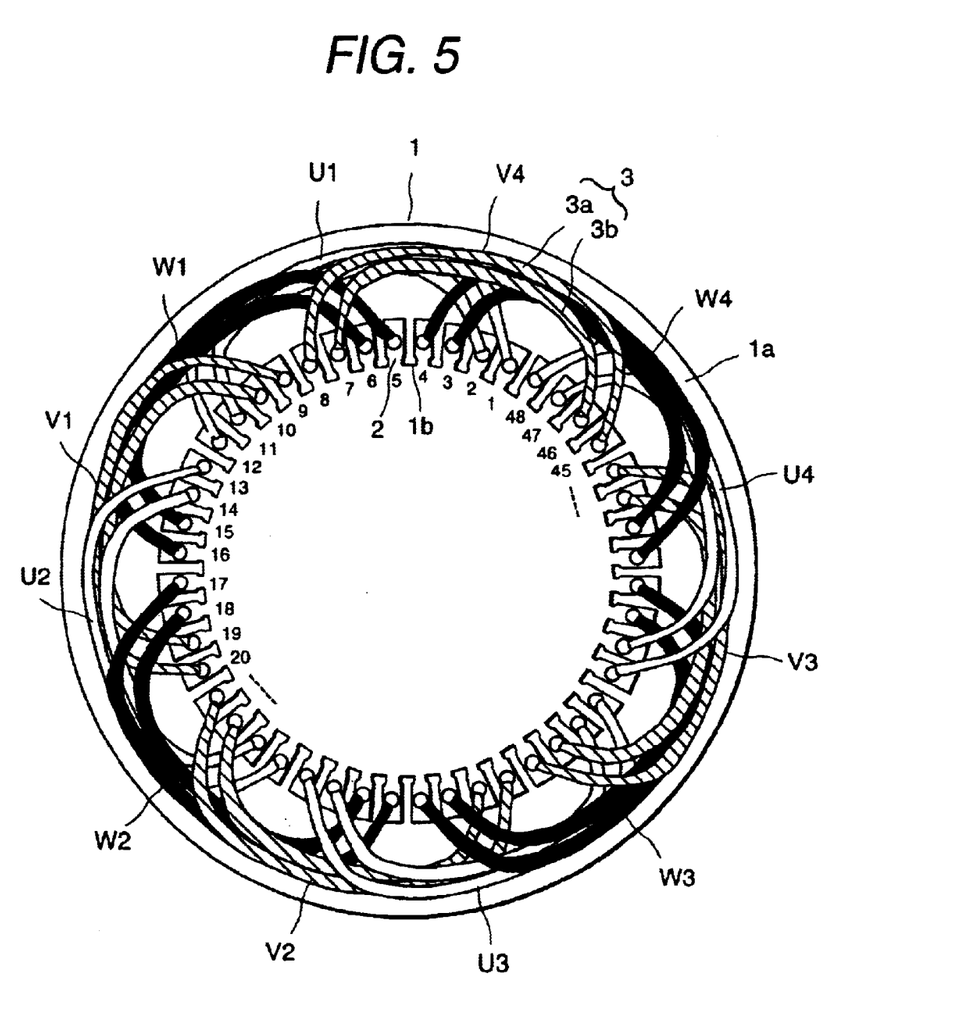
FIG. 5 is a schematic diagram showing the side face of a stator representing a third embodiment of a rotary electric machine in accordance with the present invention.

FIG. 5 is a schematic diagram showing the side face of a stator representing a third embodiment of a rotary electric machine in accordance with the present invention. The third embodiment of the stator has a structure such that the stator contains single layer distributed wound armature windings 3 in a 3-phase-4-pole stator core having 48 slots, 4 slots per pole per phase.

Each of the windings U1 to V4 for individual phases and poles comprises two coaxially wound coils 3a, 3b, and the two coils 3a, 3b for each pole of the windings U1 to V4 are individually contained in two slots adjacent to each other. That is, the two coils of the winding U1 for the U-phase are contained in the slots 2 of slot numbers 1, 2, 11 and 12, and the two coils of the winding W1 for the W-phase are contained in the slots 2 of slot numbers 5, 6, 15 and 16, and the two coils of the winding V1 for the V-phase are contained in the slots 2 of slot numbers 9, 10, 19 and 20 (and so forth).

Although the winding method employed in the second embodiment is employed in this embodiment, the winding method of the first embodiment may be employed as well.

Similarly, when the dimension of the outer axial length of the rotary electric machine is shortened, the dimension of the above-mentioned projected coil end portions are decreased by pushing and bending the coil end portions of the windings 3 toward the space near the side face of the back yoke portion 1a of the stator core 1 like a file of dominoes.

Fourth Embodiment

In the fourth embodiment, the stator core is composed of a plurality of divided cores by laminating segments stamped in a sector shape, and then partially setting the windings to the divided cores through the winding method of the above-described embodiment, and, after that, assembling the plurality of divided cores into a cylindrical shape and inserting the armature windings spreading over the divided cores into the individual slots.

Figure 6A:
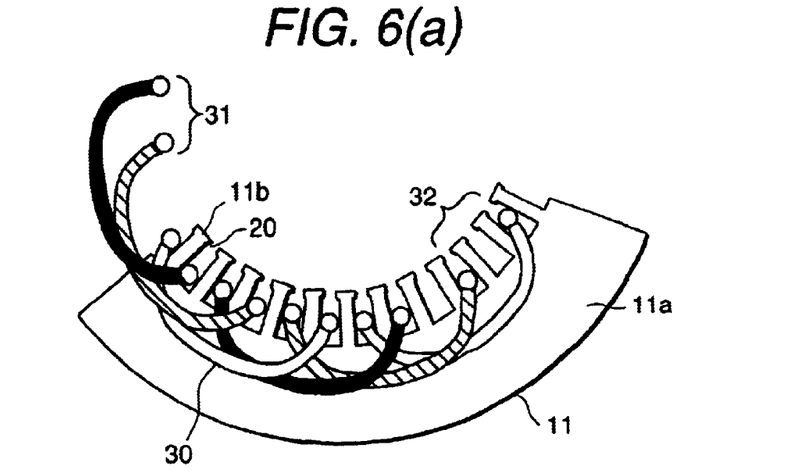
FIGS. 6(a) and 6(b) are schematic diagrams showing the side face of a stator representing a fourth embodiment of a rotary electric machine in accordance with the present invention.
Figure 6B:
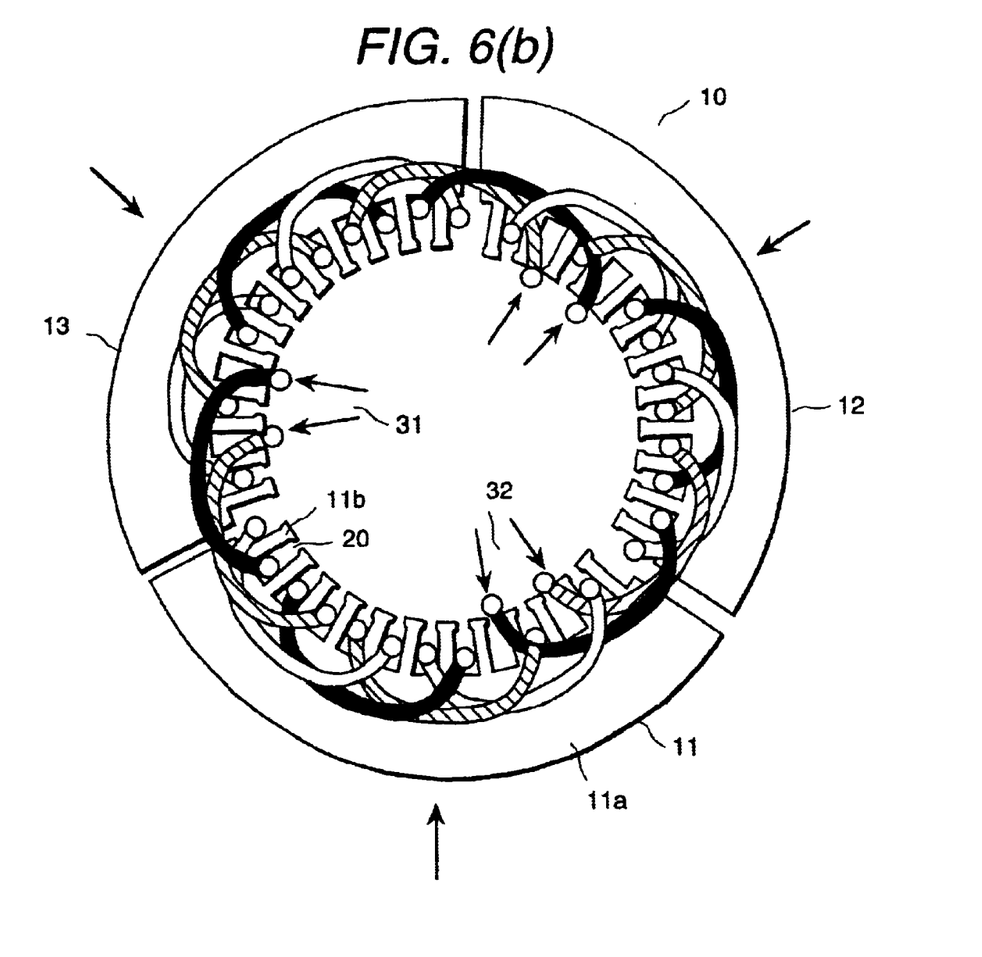

FIGS. 6(a) and 6(b) are schematic diagrams showing the side face of a stator in the fourth embodiment of a rotary electric machine in accordance with the present invention. The fourth embodiment of the stator comprises a stator core which is composed of three divided core sectors 11, 12, 13 formed by laminating segments stamped in a sector shape. The windings 30 are partially set to the divided core sectors 11 to 13 through the winding method of the second embodiment, and after that the divided core sectors 11 to 13 are joined to form in a core of cylindrical shape; and, at the same time the armature windings 31, 32 spreading over the divided core sectors are inserted into the individual slots.

FIG. 6(a) shows the state in which windings have been partially wound to one of the sectorial divided cores 11. As the method of winding in this embodiment, the method of winding in the second embodiment is employed. The windings are similarly set to the other divided core sectors 12 and 13.

FIG. 6(b) shows the state of assembling of the three divided core sectors 11 to 13 having windings partially set into the cylindrical stator core 10. In regard to the method of arranging the windings 31 to spread over the divided portion and enter into the slots 20 in the end portion of the adjacent divided core and the windings 32 to enter into the slot 20 in the end portion of its own divided core, there are two methods, that is, a method of arranging the winding by exchanging and a method of containing the winding not by exchanging. Which method should be employed may be selected depending on a status of the work place. In other words, which method should be employed is determined by which winding arrangement is selected, the winding arrangement shown by the first embodiment or the winding arrangement shown by the second embodiment.

Since the winding work applied to the divided cores 11 to 13 formed by laminating the segments stamped in the sector can be performed in an open and wide work space, the workability is better than that of the winding work applied to the stator core 10 of one-piece structure performed in a closed and narrow work place; and, accordingly, ratio of the winding cross section in the slot (a share of the windings) can be increased. Further, since the stator core 10 is constructed by assembling the divided core sectors 11 to 13, the sectorial segments composing each of the divided core sectors 11 to 13 can be stamped with a good yield to improve the use factor of the core material and to reduce the material cost.

Further, when the dimension of the outer axial length of the rotary electric machine is shortened, the dimension of the above-mentioned projected coil end portions are decreased by pushing and bending the coil end portions of the windings 3 toward the space near the side face of the back yoke portion 1a of the stator core 1 like a file of dominoes.

Fifth Embodiment

The structural arrangement of the armature windings in the stator in accordance with the present invention can be similarly applied to the stator in a linear motor. The fifth embodiment is directed to a stator in a linear motor, which takes a form similar to that of expanding the cylindrical stator of the first embodiment of the rotary electric machine.

Figure 7:
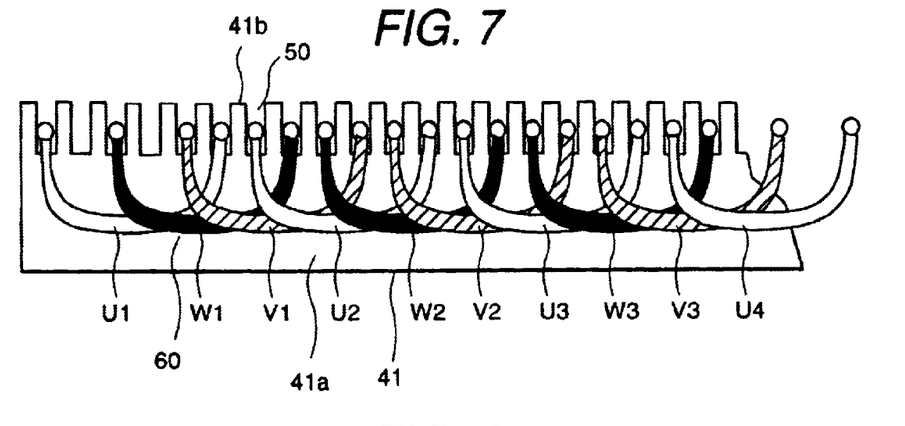
FIG. 7 is a schematic diagram showing the side face of a stator representing a fifth embodiment of a linear motor in accordance with the present invention.

FIG. 7 is a schematic view showing the side face of the stator of the linear motor in accordance with the fifth embodiment of the present invention.

Referring to FIG. 7, similar to a conventional stator core, a stator core 41 comprises a back yoke portion 41a; a plurality of tooth portions 41b extending from the upper face of the back yoke 41a; and slots 50 formed between the tooth portions 41b.

The armature windings 60 are contained in the individual slots 50 so as to be arranged in the order of the winding U1 for the U-phase, the winding W1 for the W-phase, the winding V1 for the V-phase, the winding U2 for the U-phase, the winding W2 for the W-phase, the winding V2 for the V-phase . . . (contained in order of U1, W1, V1, U2, W2, V2, . . . Un, Wn, Vn). The arrangement of the windings 60 is similar to that of the first embodiment.

When the dimension of the outer axial length of the linear motor is shortened, the dimension of the above-mentioned projected coil end portions are decreased by pushing and bending the coil end portions of the windings 60 toward the space near the side face of the back yoke portion 41a of the stator core 41 like a file of dominoes.

According to the present invention, the dimension of the projected coil end portions in the axial direction or the width direction can be decreased, and, accordingly, the thickness of the rotary electric machine can be reduced and the width of the linear motor can be decreased.

Further, by employing the divided core, the winding work can be improved and the use factor of the core material can be improved, and the work cost and the material cost can be reduced.

What is claimed is:

1. A stator comprising:
    a stator core having an even number of slots per pole per phase; and
    armature windings contained in said slots, said armature windings being wound in a single layer distributed winding,
    wherein the stator core includes:
        a yoke portion, and
        a plurality of tooth portions projected from one face of the yoke portion, each of the slots being formed between adjacent tooth portions,
    wherein the armature windings comprises:
        a first armature winding contained in two of the slots so as to bridge the two of the slots,
        a second armature winding contained in a first slot arranged between the two of the slots and a second slot of the slots so as to bridge the first and second slots, the second armature winding being different in phase from the first armature winding, and
        a third armature winding contained in a third slot arranged between the two of the slots and a fourth slot of the slots so as to bridge the third and fourth slots, the third armature winding being the same in phase as the second armature winding;
    wherein the first, second and third armature windings each have a coil end portion; and
    wherein the coil end portions of the first, second and third armature windings are projected from the slots in an axial direction of the stator core and arranged in a space facing a side face of the yoke portion by bending the projected coil end portions so as to locate one of the second and third armature windings outside the first armature winding and the other of the second and third armature windings inside the first armature winding, respectively.

2. A stator according to claim 1, wherein said stator core comprises a plurality of core portions formed by laminating segments stamped in a sector; said plurality of core portions being assembled into a cylindrical shape and said armature windings being spread over said core portions into individual slots of said stator core.

3. A stator according to any one of claims 1 and 2, wherein a dimension of said stator in an axial direction including said stator core and said coil end portions is reduced by arranging said coil end portions in the space near the side face of the yoke portion.

4. A rotary electric machine comprising the stator according to any one of claims 1 and 2; and a rotor which is held so as to be arranged opposite to said stator.

5. A linear motor comprising the stator according to any one of claims 1 and 2; and a mover which is held so as to be arranged opposite to said stator.

* * * * *